C. E. BROOKS.
POWER MEAT SAW.
APPLICATION FILED FEB. 17, 1913.

1,107,405.

Patented Aug. 18, 1914.

WITNESSES:

INVENTOR
Charles E. Brooks.

BY
ATTORNEY

UNITED STATES PATENT OFFICE.

CHARLES E. BROOKS, OF REDLANDS, CALIFORNIA.

POWER MEAT-SAW.

1,107,405.  Specification of Letters Patent.  Patented Aug. 18, 1914.

Application filed February 17, 1913. Serial No. 751,172.

*To all whom it may concern:*

Be it known that I, CHARLES E. BROOKS, a citizen of the United States, residing at Redlands, in the county of San Bernardino and State of California, have invented a new and useful Power Meat-Saw, of which the following is a specification.

My invention relates to improvements in power meat saws, and the object of my invention is to provide a meat saw which may be operated by applying power such as steam, gas or electricity. I attain this object by means of the mechanism illustrated in the accompanying drawings, in which—

Figure 1:
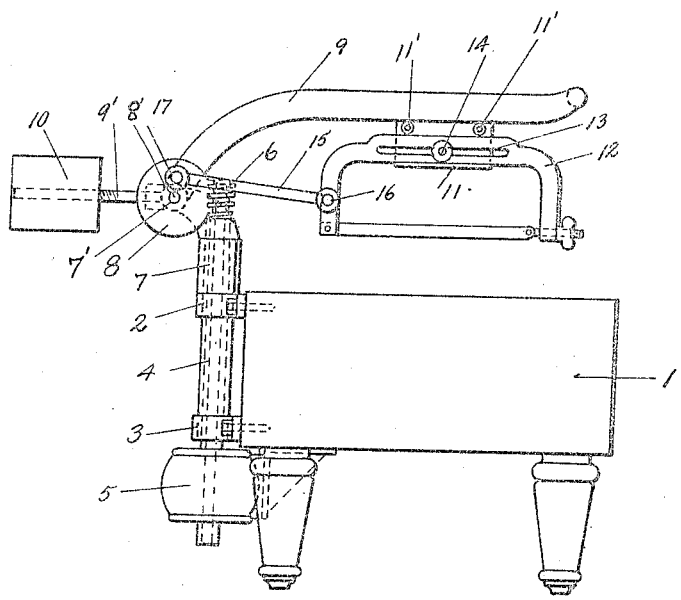
Figure 2:
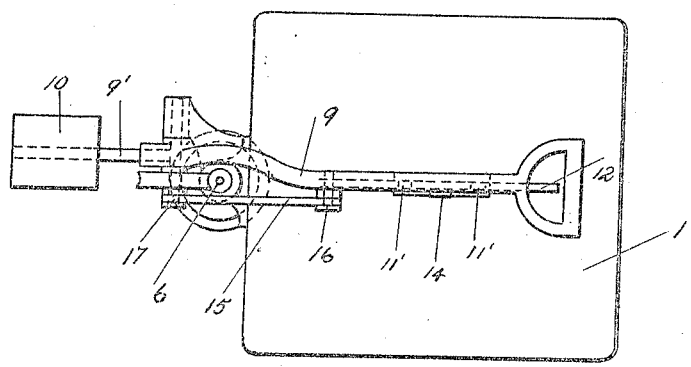

Figure 1 is a side elevation of a meat block with my power saw attached. Fig. 2 is a plan view of the same.

To the meat block 1 is attached by suitable means, the bearings 2 and 3 in which is journaled the shaft 4 of the motor 5. Above the bearing 2 the bracket bearing 7 is pivoted on the shaft 4 and has the bearing 7' above and at right angles to the bearing 7, the worm gear 8 fixed to the shaft 8' which is journaled in the bearing 7' being adapted to mesh with and be driven by the worm 6 fixed to the upper end of the shaft 4 above the bearing 7. On the opposite end of the shaft 8' from the worm gear 8, the forwardly projecting curved arm 9 is pivoted and a straight rod 9' is secured in the back of the curved arm and has adjustably mounted on its end a counterweight 10. This rod 9' may be threaded and the weight 10 screwed on it or otherwise suitably formed as to permit an adjustment of the position of the weight 10, the adjustment being made necessary for determining and establishing a balance of the arm.

A depending plate 11 is secured to the outer end of the arm 9 and has the rollers 11' revolubly mounted thereon, and a saw frame 12 having a long slot 13 in its upper portion is slidably suspended from the plate 11 by means of the roller 14 also revolubly mounted on the plate 11 substantially below and central with regard to the rollers 11', the roller 14 being adapted to engage the slot 13 in the saw frame and the rollers 11' being adapted to engage the top edge of the saw frame. The connecting rod 15 is pivoted to the rear end of the saw frame 12 at one end and at the other is eccentrically pivoted to the worm gear 8, and thus causes the saw to slide on its bearings when the worm gear revolves.

The curved arm 9 being pivoted on the shaft 8' may be lifted clear of the meat and to a vertical position when an operation is completed and may be held in such a position by the weight 10. This arm may be also turned around the pivot, the shaft 4, until entirely clear of the block 1.

In operation, when it is desired to cut a piece of meat, the saw is swung around or lowered into position for cutting and the motor started, the revolving shaft 4 of the motor turning the worm 6 and causing the worm gear 8 to revolve, which as before stated, imparts a reciprocating motion to the saw through the connecting rod 15, and the saw is kept in a straight longitudinal motion by the rollers 11' and 14. The motor 5 may be connected with a source of electricity, not shown. When the saw is raised or swung around clear of the meat or the block 1, the worm 6 and the worm gear 8 remain in mesh and turn slightly in one direction or the other according to the direction the saw is turned.

What I claim as my invention and desire Letters Patent for, is:

1. In a device of the character described, the combination with a meat cutting block and a motor secured to said block having a vertical shaft journaled in suitable bearings on the side of said block, of a bracket pivoted on the upper end of said shaft, a curved arm pivoted in said bracket, a meat saw slidably mounted on said arm, a counterweight secured to said bracket, and means on said vertical shaft and on said bracket for imparting reciprocating motion to said saw as and for the purpose specified.

2. In a device of the character described, the combination with a meat cutting block and a motor secured to said block having a vertical shaft journaled in suitable bearings on the side of said block, of a bracket pivoted on the upper end of said shaft, a curved arm pivoted on said bracket, a meat saw slidably mounted on said arm, a counterweight extending backwardly from and secured to said bracket, a worm gear revolubly mounted in said bracket whose axis is coincident with that of said arm, a worm on the upper end of said shaft adapted to mesh with said worm gear, a meat saw slidably mounted on said arm, and means for operably connecting said saw with said worm gear for causing it to slide in its bearings, for the purpose specified.

3. In a device of the character described, the combination with a meat block and a motor secured to said block having a vertical shaft suitably journaled in bearings secured to the side of said block, of a bracket pivoted on the upper end of said shaft, a shaft journaled in said bracket at right angles to said motor shaft, a worm on the upper end of said motor shaft, a worm gear on said other shaft adapted to mesh with said worm, an arm pivoted on said worm gear shaft, a meat saw slidably mounted on the forward end of said arm, and a connecting rod pivoted to said saw and eccentrically to said worm gear for causing said saw to slide in its bearings, for the purpose specified.

4. In a power meat saw, the combination with a reciprocating saw, of a swivel bracket pivoted on the drive shaft of the machine and having a shaft journaled therein at right angles to said drive shaft and a supporting arm for the saw pivoted thereon for lifting said saw from or swinging it around clear of a meat cutting block, and means operably connecting said saw with said drive shaft, for the purpose specified.

5. In a power meat saw adapted to be swung around clear of or lifted clear from a meat cutting block, the combination of a vertical motor shaft journaled in bearings secured to the side of said block, a swivel bracket pivoted on the upper end of said shaft and having a forwardly projecting saw supporting arm pivoted thereon at right angles to said motor shaft, a reciprocating saw operably mounted on said arm, a counterweight secured to the back of said bracket for holding the saw clear of said block when in its raised position above the block, and means for operably connecting said saw with said motor shaft, for the purpose specified.

CHARLES E. BROOKS.

Witnesses:
J. E. BOOKSTAVER,
NEAL YONKERS.